United States Patent
Bachmann et al.

(10) Patent No.: US 6,384,092 B2
(45) Date of Patent: May 7, 2002

(54) PROCESS FOR THE PREPARATION OF FREE-FLOWING STRONGLY ACIDIC CATION EXCHANGERS

(75) Inventors: Reinhard Bachmann, Engelsdorf; Lothar Feistel, Delitzsch; Rüdiger Seidel, Sandersdorf; Karl-Heinz Siekiera, Wolfen; Kurt Wegewitz, Bitterfeld, all of (DE)

(73) Assignee: IAB Ionenaustauscher GmbH Bitterfeld, Grappin (DE)

( * ) Notice: Subject to any disclaimer, the term of this patent is extended or adjusted under 35 U.S.C. 154(b) by 0 days.

(21) Appl. No.: 09/757,997

(22) Filed: Jan. 10, 2001

Related U.S. Application Data

(62) Division of application No. 09/091,559, filed as application No. PCT/EP96/05785 on Dec. 20, 1996.

(30) Foreign Application Priority Data

Dec. 21, 1995 (DE) .......................... 195 48 011
Oct. 24, 1996 (DE) .......................... 196 44 222

(51) Int. Cl.⁷ ............................... B01J 39/16
(52) U.S. Cl. .................... 521/28; 521/33; 526/222; 526/225; 526/229
(58) Field of Search ................ 521/28, 33; 526/229, 526/222, 225

(56) References Cited

U.S. PATENT DOCUMENTS

| | | |
|---|---|---|
| 2,366,007 A | 12/1944 | D'Alelio et al. |
| 2,961,417 A | 11/1960 | Small |
| 3,168,486 A | 2/1965 | Small |
| 3,262,891 A | 7/1966 | Abrams et al. |
| 3,549,562 A | 12/1970 | Mindick et al. |
| 3,717,594 A | 2/1973 | Ryan |
| 4,347,328 A | 8/1982 | Harmon et al. |
| 4,664,811 A | 5/1987 | Operhofer |
| 4,770,790 A | 9/1988 | Operhofer |
| 5,902,833 A | 5/1999 | Tasaki |

FOREIGN PATENT DOCUMENTS

| | | |
|---|---|---|
| DE | 196 44 217 A1 | 6/1997 |
| EP | 0 009 395 A1 | 4/1980 |
| EP | 0 223 596 A2 | 5/1987 |
| FR | 2075.648 | 8/1971 |
| GB | 1078055 | 8/1967 |

*Primary Examiner*—Fred Zitomer
(74) *Attorney, Agent, or Firm*—Norris McLaughlin & Marcus

(57) ABSTRACT

Sulfonated strongly acidic cation exchangers are rendered free-flowing by treatment with wetting agents or water soluble initiators, washing with water at temperatures of at least 60° C. and heat drying.

2 Claims, 1 Drawing Sheet

Appendix: Dimensions of the efflux funnel
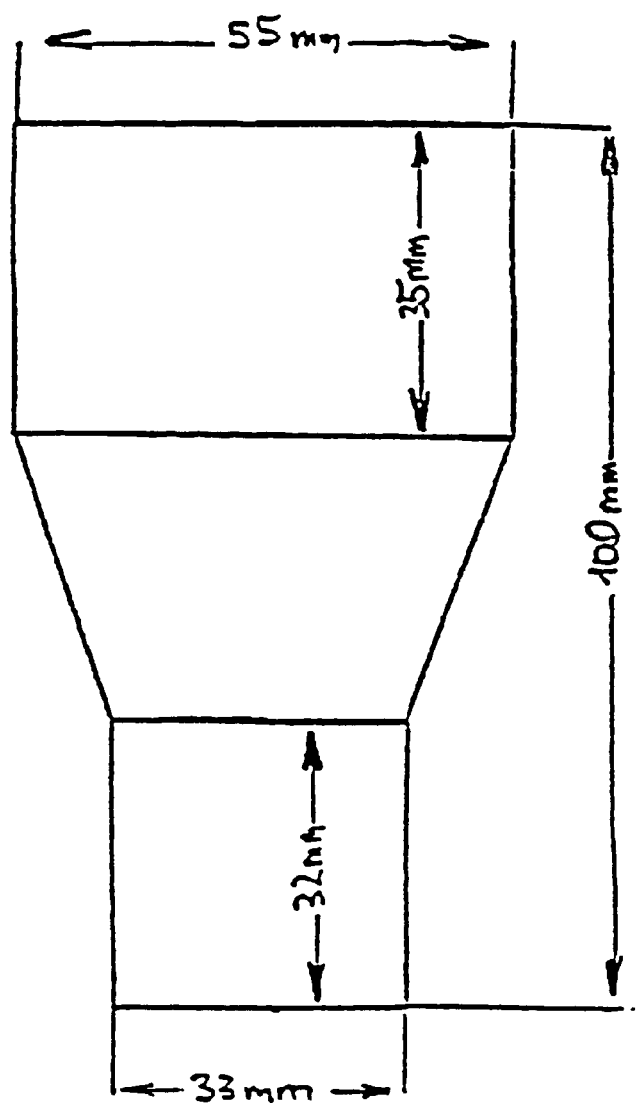

PROCESS FOR THE PREPARATION OF FREE-FLOWING STRONGLY ACIDIC CATION EXCHANGERS

This is a Division of application Ser. No. 09/091,559, filed Jun. 18, 1998 now abandoned which is a 371 of PCT/EP96/05785.

The invention relates to processes for the preparation of free-flowing end products of strongly acidic cation exchangers prepared according to Patent Application P 195 48 012.0 (=U.S. Pat. No. 6,228,896).

Strongly acidic cation exchangers prepared by the processes of the publications cited in Patent Application P 195 48 012.0 (=U.S. Pat. No. 6,228,896) with and without the use of inert swelling agents, as well as the strongly acidic cation exchangers prepared by the process according to the invention and of the patent application mentioned, have the disadvantageous property that the cation exchanger dewatered in a filter at the end of the preparation process are not sufficiently free-flowing for industrial handling, further processing and use.

EP 0 009 395 discloses the addition of wetting agents and water-soluble initiators in the polymerization stage. With the aid of the additions, the formation of an emulsion of extremely fine-particled ion exchangers, particle size 0.01–1.5 µm, is achieved but the surface charge of coarse particles in the anhydrous state is not influenced in such a way that they become free-flowing as bulk material. The treatment of sulphonated styrene/divinylbenzene copolymer with water is part of the preparation process described in EP 0 009 395 for cation exchangers. The end products thus prepared are not free-flowing.

EP 0 223 596 A 2 describes the hydration of the sulphonated product containing sulphuric acid in the process for the preparation of a cation exchanger.

However, the treatment of the sulphonated cation exchanger with water in this process stage does not result in the free flowability of the end product. The relevant technical literature proposes no solutions for eliminating these disadvantageous properties of the particle beads of strongly acidic cation exchangers.

It is the object of the invention to influence the preparation process of strongly acidic cation exchangers by suitable additions of substances and/or process engineering measures so that the particle beads of the end products are free-flowing.

It has now been found that free-flowing strongly acidic cation exchangers can be prepared by means of additions of substances and process engineering measures in the polymerization stage or after the filtration of the end product. Specifically, these are subsequent procedures according to the invention which lead to a substance known per se and having novel properties:

1. Free-flowing end products are obtained if the preparation of the starting material for the strongly acidic cation exchanger, the styrene/divinylbenzene copolymer is influenced in such a way that a higher proportion of emulsion polymer forms. This is achieved, according to the invention, by adding wetting agents, e.g. sodium salts of alkanesulphonic acids having a chain length $C_{12}$–$C_{18}$ in a concentration of up to 0.25 g/l of water or 0.05 to 0.20 g/l of water of a water-soluble initiator, such as, for example, potassium peroxydisulphate ($K_2S_2O_8$)

to the batch of the copolymerization system 20 to 120 min after reaching the gel point.

Strongly acidic cation exchangers prepared according to Examples 1 and 2 are permanently free-flowing.

2. Free-flowing end products are also obtained if the non-free-flowing strongly acidic cation exchangers prepared by the procedure cited are treated with surface-active substances, such as nonionic surfactants, as prepared by an addition reaction of ethylene oxide and propylene oxide with natural fatty alcohols having a chain length $C_{12}$–$C_{14}$, or alkylphenol polyethylene glycol ethers or cationic and amphoteric surfactants or emulsifiers of the fatty alcohol polyalkylene glycol ether type or anionic surfactants of the paraffinsulphonate type.

If the strongly acidic cation exchanger is used in the food industry (e.g. drinking water preparation), the surface-active substance must be suitable as an additive for food. Sorbitan fatty acid esters and polyoxyethylene (20) sorbitan fatty acid esters may be used for this purpose.

According to the invention, this is achieved by treating the end products dewatered in a filter at the end of the preparation process, in a downstream batch or column process, with an aqueous solution which contains a surface-active substance or a mixture of surface-active substances in amounts of 0.1 to 5 g/l of resin. The products are then dewatered and dispatched. The free flowability produced here is temporary and eliminated again by washing with water. Such free-flowing strongly acidic cation exchangers can be prepared according to Examples 3 and 4.

3. Free-flowing strongly acidic cation exchangers are furthermore obtained by subjecting the end products, the non-free-flowing strongly acidic cation exchangers, to a hot water wash which simultaneously purifies the end products and utilizes the heat content of the end products for its superficial drying. According to the invention, the desired effect is achieved by treating the non-free-flowing strongly acidic cation exchangers with hot water at a temperature equal to or higher than 60° C. for at least 1 hour, not more than 4 hours, and drying the said cation exchangers after removal of the water utilizing the product heat. By passing through air- or nitrogen, the removal of moisture is accelerated, the residual moisture content is reduced and the free-flowing state of the strongly acidic cation exchanger is reached earlier.

Strongly acidic cation exchangers prepared according to Examples 5 to 7 are temporarily free-flowing.

To evaluate the free flowability, the efflux characteristic from a defined funnel was determined. The dimensions of the funnel are shown in the attached drawing sheet.

The material of the funnel, each having the same internal dimensions, consisted a) of Teflon and b) of C2A stainless steel.

The sample material is filled loosely into the funnel.

The outlet orifice of the funnel is closed.

To carry out the flow test, the funnel outlet is opened without vibration.

The flowability of the strongly acidic cation exchangers is assessed according to the following criteria:

1. Total material flows by itself out of the funnel
2. Only the lower part of the funnel flows out spontaneously, and the complete content as a result of lightly tapping the funnel 3. The lower part of the funnel flows out spontaneously; the sample material remains in the upper part of the funnel even with intensive tapping
4. The lower part of the funnel flows out of the funnel only after intensive tapping
5. No material at all flows out of the funnel, not even with tapping.

End products having the rating 1 are classified as "free-flowing". Since the funnel material considerably influences the efflux behaviour of the end products, the abovementioned evaluations must be carried out in both funnels.

Using the processes according to the invention, the disadvantages associated with the end products are overcome and the following advantageous properties and effects achieved.

The products are free-flowing

The free flowability does not give rise to any technical problem in packaging in the production unit.

No metering problems into small containers at the customer's premises

An additional purification of the product occurs during the hot washing/separation/drying variant The additions of substances to the copolymerization system have the advantage that an after-treatment of the end products after the filtration is dispensed with.

EXAMPLE 1

Polymerization is carried out as follows in a polymerization apparatus consisting of a 2 l beaker having a plane ground joint and equipped with stirrer, contact thermometer, gas inlet tube and condenser and infrared heating:

900 ml of spring water are initially introduced and 7.3 g of anhydrous $MgSO_4$ and 20 g of NaCl are dissolved. Thereafter, 25 ml of Wotamol solution (1 g/l) and 11 ml of Sapal solution (1 g/l) are added and heating is carried out at 40° C. and 5.8 g of caustic soda, dissolved in 100 ml of water, are added and heating is carried out to 71° C.

At this temperature, 500 g of the polymerizable phase are added while blanketing with nitrogen (5–10 l/h). The said phase consists of 442.5 g of styrene, 57.7 g of divinylbenzene (65.14% strength) and 0.45 g of Perkadox as initiator. The organic phase is distributed over the desired particle size by stirring and is kept at this temperature. The organic substances polymerize and go into the gel-like state. Once this has occurred, the temperature is kept at 69° C. for 3 h. 1 h after the gel point 250 mg of the wetting agent Mersolat (tradename for Na salts of alkane-sulphonic acids of the chain length $C_{12}$–$C_{18}$) are introduced into the suspension.

After the polymerization phase, heating is carried out to 95° C. and curing is effected at this temperature for 4 h. The total batch is cooled to room temperature, then added to a 0.25 mm sieve and separated from the aqueous phase and the polymer is washed neutral with spring water and filtered off with suction. The polymer is dried for 2 h at 105° C. and sieved 50 g of the particle fraction 0.25–0.8 mm are swollen in the customary manner with dichloroethane and sulphonated with 200 ml of conc. sulphuric acid for 6 h at 105° C. After cooling to room temperature, the product is separated from the sulphuric acid and is thoroughly washed stepwise with 60, 40, 20% strength sulphuric acid, 20% strength, 10% strength NaCl solution and water and rendered neutral with dilute sodium hydroxide solution. The strongly acidic cation exchanger obtained is free-flowing.

EXAMPLE 2

In the same polymerization apparatus as described in Example 1, an analogous aqueous phase is prepared and heated to 71° C. The organic phase consisting of the same component in the same mixing ratios is added and polymerized. 2 hours after the gel point, 200 mg of potassium peroxydisulphate are added and the polymerization is completed as in Example 1. The polymer is then separated off, worked up and sulphonated under the same conditions, also as in Example 1. The product is free-flowing.

EXAMPLE 3

250 ml of a strongly acidic cation exchanger based on a styrene/divinylbenzene copolymer having a divinylbenzene content of 7.8% by weight in the sodium form are placed on a frit and treated for up to 60 min with 500 ml of a 0.1% strength solution of the emulsifier Lamesorb SML-20 and then filtered off with suction. The product is free-flowing.

EXAMPLE 4

250 ml of a strongly acidic exchanger analogous to Example 3 are placed on a filter and treated for up to 20 min with 500 ml of a 0.4% strength antifoam solution 7800 and then filtered off with suction. The product is free-flowing.

EXAMPLE 5

5 $m^3$ of a cation exchanger analogous to Example 3 are stirred with 4–5 $m^3$ of water for 2 h at 65° C. in a wash vessel, discharged into a filter, dewatered and transferred to a cyclone and treated with 500 $m^3$ of air per $m^3$ of exchanger over a period of 2 h. The product is free-flowing and has 42% of moisture.

The separation of the product from the wash water can also be effected by means of a screen centrifuge.

EXAMPLE 6

200 ml of a strongly acidic cation exchanger as in Example 3 are made into a slurry with 200 ml of water and stirred for 2 h at 80° C. Thereafter, the slurry is transferred to a filter and separated from the liquid, and air is sucked through in an amount of 30 l/h. During this procedure, the material cools down (to 20° C.) and is free-flowing after 20 minutes.

EXAMPLE 7

23 kg of a strongly acidic cation exchanger—as in Example 3—are made into a slurry with 46 l of warm water at 63° C. and stirred for 30 minutes. The slurry was then separated on a Konturbex H 250 screen centrifuge from the company Siebtechnik Mülheim/Ruhr. The resin having a layer height of 5–15 mm was brought into contact with the room air without movement and was free-flowing after 23 minutes.

What is claimed is:

1. Method for preparing strongly acidic cation exchangers which are free-flowable and which comprises treating strongly acidic cation exchangers obtained by sulphuric acid sulponation of styrene/divinylbenzene copolymers, by:
   1. adding
      a) wetting agents in an amount of up to 0.25 g/l of aqueous phase, or
      b) water-soluble initiators in an amount of from 0.05 to 20 g/l of aqueous phase
      to the copolymerization system in which the copolymers for the cation exchangers are produced, 20–120 minutes after the copolymers reach the gel point, or
   2. washing the strongly acid cation exchanger, after filtration, with water having a temperature of at least 60° C., and heat drying.

2. Process for the preparation of free-flowing strongly acidic cation exchangers according to claim 1, point 1, wherein sodium salts of alkanesulphonic acids having a chain length of $C_{12}$–$C_{18}$, as wetting agents, or potassium peroxydisulphate ($K_2S_2O_8$), as water-soluble initiator, are added to the copolymerization system.

* * * * *